Nov. 7, 1950  W. T. GINDLESPERGER  2,528,824
ADAPTABLE THREADED CONNECTING MEMBER
Filed July 5, 1947
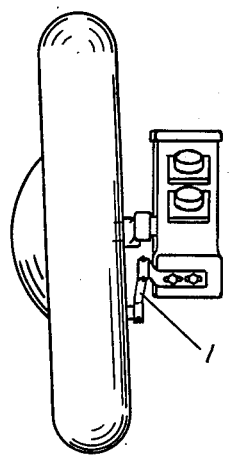
FIG. 2
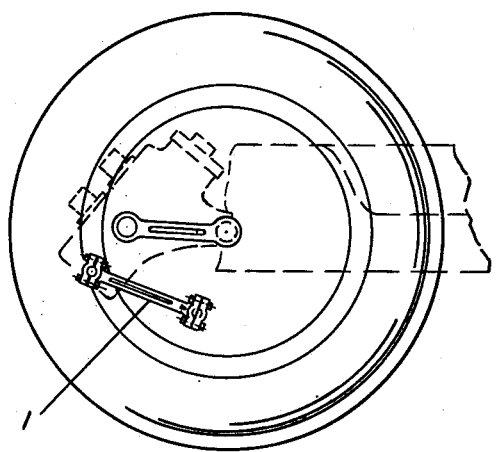
FIG. 1
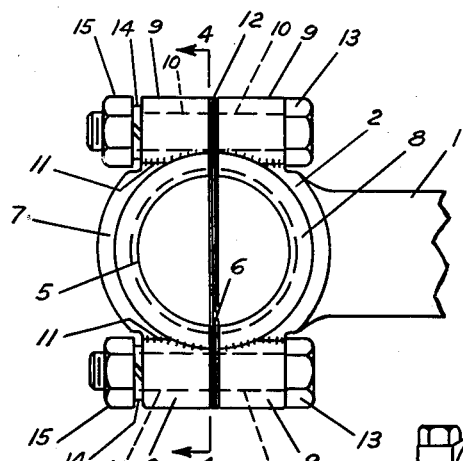
FIG. 3
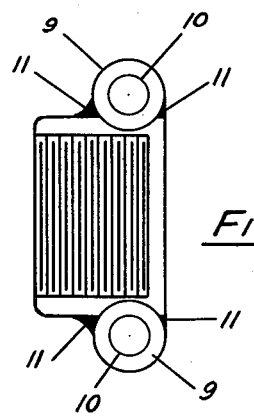
FIG. 4
FIG. 7
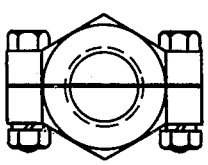
FIG. 8
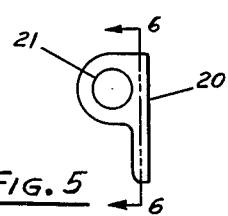
FIG. 5
FIG. 6
INVENTOR.
William T. Gindlesperger
BY
Florence G. Miller
Atty.

Patented Nov. 7, 1950

2,528,824

UNITED STATES PATENT OFFICE 2,528,824

ADAPTABLE THREADED CONNECTING MEMBER

William T. Gindlesperger, Erie, Pa.

Application July 5, 1947, Serial No. 759,024

2 Claims. (Cl. 287—111)

This invention relates generally to a novel method and means for rebuilding threaded apertures in radius rods, nuts and like parts.

It has heretofore been necessary to replace the threaded ends of radius rods and other connecting members such as the radius rod utilized in vehicles with knee action suspension when the threads were stripped or damaged. Where these threaded ends are subjected to heavy stresses and vibration, the threads quickly wear to a point where they become stripped and they cannot be re-threaded or tapped because of the enlargement of the aperture and therefore a new radius rod must be used to replace the old one. No means has heretofore been provided to rebuild the threaded end of a rod while still maintaining the efficiency thereof.

It is, accordingly, an object of my invention to provide a novel method of rebuilding and utilizing the worm threaded apertured end of a torque rod or the like.

Another object of my invention is to provide an apertured threaded end of a rod which may be built up to permit adjustment of the size of the aperture in accordance with the wear of the threads therein.

Another object of my invention is to provide an adjustable locking nut wherein the diameter of the threaded aperture may be varied.

Other objects of my invention will become evident from the following detailed description, taken in conjunction with the accompanying drawings, in which Fig. 1 is a side elevational view of an assembled radius rod connected to the main spring housing of a knee action suspension device and to the brake flange of a wheel, with my novel built-up adjustable ends;

Fig. 2 is an end elevational view of the rod shown in Fig. 1;

Fig. 3 is a fragmentary side elevational view of the end of a torque rod having my novel adjusting shims built-up according to my invention;

Fig. 4 is a view taken on the line 4—4 of Fig. 3;

Fig. 5 is a side elevational view of a modified form of shim for my novel invention;

Fig. 6 is a view taken on the line 6—6 of Fig. 5;

Fig. 7 is a side elevational view of a nut built-up in accordance with my novel invention; and Fig. 8 is a side elevational view of one section of the nut shown in Fig. 7.

Referring now to the drawings, for purposes of illustration I show my novel invention applied to a torque rod used in conjunction with a knee action suspension system of an automobile and to a nut.

The threaded apertured ends of a torque rod become worn and stripped in normal operation because of shock, impact, vibration and the like which places heavy stresses on the weakest part of the rod—the threads in the apertured ends thereof or the threads of the stud to which they are engaged. It has heretofore been necessary to replace the old rod with a new rod as the threaded apertured ends thereof could not be rethreaded without greatly enlarging the aperture. A torque rod rebuilt in accordance with my invention is shown in Figs. 3 and 4 wherein the torque rod 1 has the normally closed apertured end 2 thereof split transversely and centrally of the threaded aperture 5 at 6 by any suitable cutting member such as a hack saw to form complementary semi-circular shaped portions 7 and 8.

Tubular members 9 having apertures 10 are connected to each side of the semi-circular shaped split portions 7 and 8 in aligned and parallel relationship by brazing or welding at 11. A laminated shim 12 is then disposed between the split portions 7 and 8 as shown in Fig. 3. Machine bolts 13 are disposed in the aligned apertures 10 of the tubular members 9 and lock washers 14 and nuts 15 provide means for drawing the split portions 7 and 8 together. Layers of the laminated shim 12 may be peeled off in order to provide adjustment and variation in the diameter of the threaded aperture 2 formed by the semi-circular shaped threaded split portions 7 and 8.

If the threads of threaded aperture 2 are not damaged, it is not necessary to rethread but if they are damaged, the aperture 2 may be rethreaded in that the diameter thereof may be adjusted. I have found that the engaging threads in my novel member engage fully on all surfaces because of their adjustability, thereby greatly strengthening the threaded connection.

In Figs. 5 and 6 I have shown a laminated shim 20 having an aperture 21 which may be disposed on the outer sides of the split portions 7 and 8 without having a narrow connecting portion therebetween. The shims 20 may be peeled and provide adjustment in the size of the threaded aperture the same as the shim 8 shown in Fig. 3 which is a one piece shim.

In Figs. 7 and 8, I show a nut 30 which has been split in accordance with my invention. The nut 30 has apertured tubular members 31 aligned and in parallel relationship disposed on opposite sides of the complementary split portions 32 and 33, the portions 32 and 33 being secured together and adjusted by bolt and nut assemblies 34. A laminated shim 35 is disposed between the complementary split portions 32 and 33 to provide adjustment therebetween. It will be evident that this nut may be securely locked on a threaded nut or shaft and it may be disposed on an assembled threaded member where the old worm nut cannot be unthreaded therefrom.

Although I have shown my novel invention applied to a radius rod for a knee-action suspension for an automobile, and to a nut, it will be evident that my invention may be utilized in any situation where the internal threads on the threaded end of a rod are worn or stripped and it is necessary to reduce the diameter of the threaded aperture. My novel threaded aperture may be varied in size, and any play may be taken up by peeling the shims. My novel method may be utilized in the smallest garage in that a hack saw may be utilized for splitting the apertured threaded end of a rod and any conventional welding or brazing unit may be utilized for fastening the members 9 to the outer side of the split portions 7 and 8 of the rod 1. It is not necessary that the members 9 be tubular in shape as long as the apertures 10 therein are in alignment so that a fastening bolt and nut assembly, or equivalent may be extended therethrough.

Various changes may be made in the specific embodiment of my invention or the method utilized without departing from the spirit thereof or from the scope of the appended claims.

What I claim is:

1. A rod for connection to a threaded cylindrical member comprising a rod, an enlarged threaded apertured end on said rod split transversely and centrally thereof, apertured aligned members welded onto each side of each split portion substantially parallel to the axis of said rod, a laminated shim disposed between said split portions and bolt and nut assemblies including nuts and bolts to draw said split portions together, said bolts extending through said adjacent apertured aligned members.

2. A rod comprising adjustable complementary arcuate shaped threaded portions on one end thereof forming a threaded aperture, a multiple layer shim disposed between said complementary portions, aligned tubular members welded to opposite sides of each of said complementary portions and bolt and nut assemblies extending through said aligned apertured tubular members.

WILLIAM T. GINDLESPERGER.

REFERENCES CITED

The following references are of record in the file of this patent:

UNITED STATES PATENTS

| Number | Name | Date |
|---|---|---|
| 904,296 | Bashford | Nov. 17, 1908 |
| 1,226,431 | Woodford | May 15, 1917 |
| 1,294,848 | Thompson | Feb. 18, 1919 |
| 1,683,516 | Adams | Sept. 4, 1928 |
| 1,816,421 | Clark et al. | July 28, 1931 |
| 1,831,325 | Short | Nov. 10, 1931 |
| 1,994,582 | Leighton | Mar. 19, 1935 |
| 2,371,399 | Mantle | Mar. 13, 1945 |